(12) United States Patent
Gengelbach

(10) Patent No.: US 8,484,173 B1
(45) Date of Patent: *Jul. 9, 2013

(54) DETERMINING DIFFERENCES BETWEEN DOCUMENTS

(75) Inventor: Jay Gengelbach, San Bruno, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/398,469

(22) Filed: Feb. 16, 2012

Related U.S. Application Data

(63) Continuation of application No. 12/044,544, filed on Mar. 7, 2008, now Pat. No. 8,121,989.

(51) Int. Cl.
*G06F 17/00* (2006.01)

(52) U.S. Cl.
USPC .......................................................... 707/695

(58) Field of Classification Search
USPC .......................................... 707/695; 715/229
See application file for complete search history.

(56) References Cited

U.S. PATENT DOCUMENTS

| | | | |
|---|---|---|---|
| 5,553,216 A | 9/1996 | Yoshioka et al. | |
| 5,806,078 A | 9/1998 | Hug et al. | |
| 6,236,993 B1 | 5/2001 | Fanberg | |
| 6,560,620 B1 | 5/2003 | Ching | |
| 6,658,626 B1 | 12/2003 | Aiken | |
| 7,071,934 B1 | 7/2006 | Faoro et al. | |
| 7,185,277 B1 | 2/2007 | Bernstein et al. | |
| 7,295,965 B2 | 11/2007 | Haigh et al. | |
| 7,320,009 B1 | 1/2008 | Srivastava et al. | |
| 7,676,506 B2 * | 3/2010 | Reinsch | 707/695 |
| 8,121,990 B1 * | 2/2012 | Chapweske et al. | 707/695 |
| 2003/0028561 A1 | 2/2003 | Gounares et al. | |
| 2004/0054967 A1 * | 3/2004 | Brandenberger | 715/511 |
| 2004/0083091 A1 * | 4/2004 | Ie et al. | 704/9 |
| 2007/0174351 A1 | 7/2007 | Liu et al. | |
| 2007/0299886 A1 | 12/2007 | Novak | |
| 2008/0162456 A1 | 7/2008 | Daga et al. | |
| 2012/0016850 A1 * | 1/2012 | Borden et al. | 707/695 |

* cited by examiner

*Primary Examiner* — Wilson Lee
*Assistant Examiner* — Thuy Bui
(74) *Attorney, Agent, or Firm* — Sterne, Kessler, Goldstein & Fox P.L.L.C.

(57) ABSTRACT

Embodiments of a computer system that compares documents are described. During operation, the computer system identifies a set of matching elements and associated locations in a first document and a second document. Next, the computer system repeatedly identifies additional sets of matching elements and associated locations in the first document and the second document until there are no further matches. Note that a given additional set of matching elements may be different than the set of matching elements and other additional sets of matching elements.

28 Claims, 7 Drawing Sheets

```
                    ┌─ 400
┌─────────────────────────────┐   ┌─────────────────────────────┐
│  DOCUMENT                   │   │  DOCUMENT                   │
│  410-1                      │   │  410-2                      │
│                             │   │                             │
│         10. COMPUTER CODE A │   │  10. COMPUTER CODE A        │
│                             │   │                             │
│  MOVED  11. COMPUTER CODE B │   │  11. COMPUTER CODE B  MOVED │
│ POINTER TO 16               │   │                      POINTER TO 15 │
│         12. COMPUTER CODE C │   │  12. COMPUTER CODE G        │
│                             │   │                             │
│         13. COMPUTER CODE D │   │  13. COMPUTER CODE D        │
│                             │   │                      CHANGED │
│                             │   │  14. COMPUTER CODE I        │
│                             │   │                             │
│  MOVED  14. COMPUTER CODE F │   │  15. COMPUTER CODE F  MOVED │
│ POINTER TO 12               │   │                      POINTER TO 12 │
│         15. COMPUTER CODE G │   │  16. COMPUTER CODE C        │
│ CHANGED                     │   │                      CHANGED │
│         16. COMPUTER CODE H │   │  17. COMPUTER CODE H + I    │
└─────────────────────────────┘   └─────────────────────────────┘
```

DETERMINING DIFFERENCES BETWEEN DOCUMENTS

CROSS-REFERENCE TO RELATED APPLICATION

This application is a continuation of U.S. application Ser. No. 12/044,544, filed Mar. 7, 2008, which is incorporated by reference herein in its entirety.

BACKGROUND

1. Field

The present embodiments relate to techniques for comparing documents.

2. Related Art

During software development, changes to computer-software instructions or source code by one software developer are sometimes reviewed by other software developers. This review process may be facilitated by a differencing tool (which is sometimes referred to as a 'diff' tool) that can determine and display the differences between two versions of a file, such as an original version and an updated version of the file. For example, if a software developer changes one line in a file that includes 10,000 lines, the reviewer may only need to examine that line for changes, rather than re-reading the entire file (the bulk of which was previously reviewed).

However, such differencing tools often do not detect a region that has been moved from one location in a file to another. Instead, these existing tools may indicate that the region has been 'removed' from the original version of the file and 'inserted' into the updated version of the file, when, in fact, the content of this region is present in the original version of the file and is unchanged. This can be problematic for reviewers, especially when the moved regions are large, for example, if the reviewer would like to review any changes as quickly as possible and/or would prefer not to examine different regions manually to determine the differences (if any) between them.

SUMMARY

One embodiment provides a computer system that compares documents. During operation, the computer system identifies a set of matching elements and associated locations in a first document and a second document. Next, the computer system repeatedly identifies additional sets of matching elements and associated locations in the first document and the second document until there are no further matches. Note that a given additional set of matching elements is different than the set of matching elements and other additional sets of matching elements.

In some embodiments, the first and second documents include computer-software instructions. Moreover, in some embodiments the first and second documents include web pages.

In some embodiments, the second document is a revised version of the first document. Moreover, a time stamp associated with a modification of the second document may be later than a time stamp associated with a modification of the first document.

In some embodiments, the documents are stored in a repository of documents that includes documents scraped from host sites on a network. Note that the network may include the Internet and/or an intranet.

In some embodiments, a given set of matching elements, which can be the set of matching elements or one of the additional sets of matching elements, includes one or more characters, one or more words, or one or more lines. Moreover, a size of the given additional set of matching elements may be smaller than sizes of the set of matching elements and/or other additional sets of matching elements.

In some embodiments, identifying the set of matching elements and additional sets of matching elements involves using a longest-common-subsequence technique.

In some embodiments, the computer system removes all instances of the set of matching elements in the first document and the second document prior to repeatedly identifying the additional sets of matching elements. Moreover, the computer system may add a marker corresponding to the set of matching elements at a given instance of the set of matching elements in the first document and the second document.

In some embodiments, one or more locations of a given additional set of matching elements in the second document are different than one or more locations of the given additional set of matching elements in the first document.

In some embodiments, the computer system computes the information content of a given set of matching elements, where the given set of matching elements can be the set of matching elements or one of the additional sets of matching elements. For example, the information content may be based on how many characters are in the given set of matching elements. Moreover, computing the information content may include applying a first weight to a first character in the given set of matching elements and a second weight to a second character in the given set of matching elements.

Note that the information content may be computed based on a programming language of the first document and/or the second document.

In some embodiments, the computer system assigns a label of 'unchanged' to instances of the set of matching elements in the second document if the information content of the set of matching elements is greater than or equal to a pre-determined value. Additionally, the computer system may assign a label of 'changed' to instances of the set of matching elements in the second document if the information content of the set of matching elements is less than the pre-determined value.

Moreover, the computer system may assign a label of 'moved' to instances of one of the additional sets of matching elements in the second document if the information content of the one of the additional sets of matching elements is greater than or equal to another pre-determined value. Additionally, the computer system may assign a label of 'changed' to instances of the one of the additional sets of matching elements in the second document if the information content of the one of the additional sets of matching elements is less than the other pre-determined value.

In some embodiments, the computer system assigns a label of 'changed' to a remainder of the second document, where the remainder excludes the instances of the set of matching elements and the instances of the additional sets of matching elements.

Moreover, the computer system may combine adjacent additional sets of matching elements into a group of matching elements. For example, the adjacent additional sets of matching elements may include two additional sets of matching elements that have 'moved' labels which are separated by an intervening additional set of matching elements that has a 'changed' label into a single group of elements, and the single group of elements may have a label of 'moved and changed.'

In some embodiments, the computer system displays the first document and the second document with context information based on those portions of the second document that are associated with labels of 'moved' and/or 'changed.' Note that the context information displayed with the first document may include a pointer to a location of an instance of one of the additional sets of matching elements in the second document.

Another embodiment provides a method including at least some of the above-described operations that are performed by the computer system.

Another embodiment provides a computer-program product for use in conjunction with the computer system. This computer-program product may include instructions corresponding to at least some of the above-described operations that are performed by the computer system.

Another embodiment provides another computer-program product for use in conjunction with the computer system. This other computer-program product may include instructions for a process, where the instructions include one or more sets of elements and associated context information. Moreover, the sets of elements may be related to one or more subsets of a previous version of the computer-program mechanism. Furthermore, the context information may be associated with a given set of elements including a label that identifies whether the given set of elements is 'unchanged,' 'moved,' or 'changed' with respect to at least a corresponding subset of the previous version of the computer-program mechanism. Note that the context information associated with the given set of elements may include one or more pointers to one or more locations of at least the corresponding subset if the given set of elements and the subset are substantially the same. Additionally, note that the context information may facilitate comparisons of the computer-program mechanism and the previous version of the computer-program mechanism.

BRIEF DESCRIPTION OF THE FIGURES

Note that like reference numerals refer to corresponding parts throughout the drawings.

DETAILED DESCRIPTION

Figure 1:
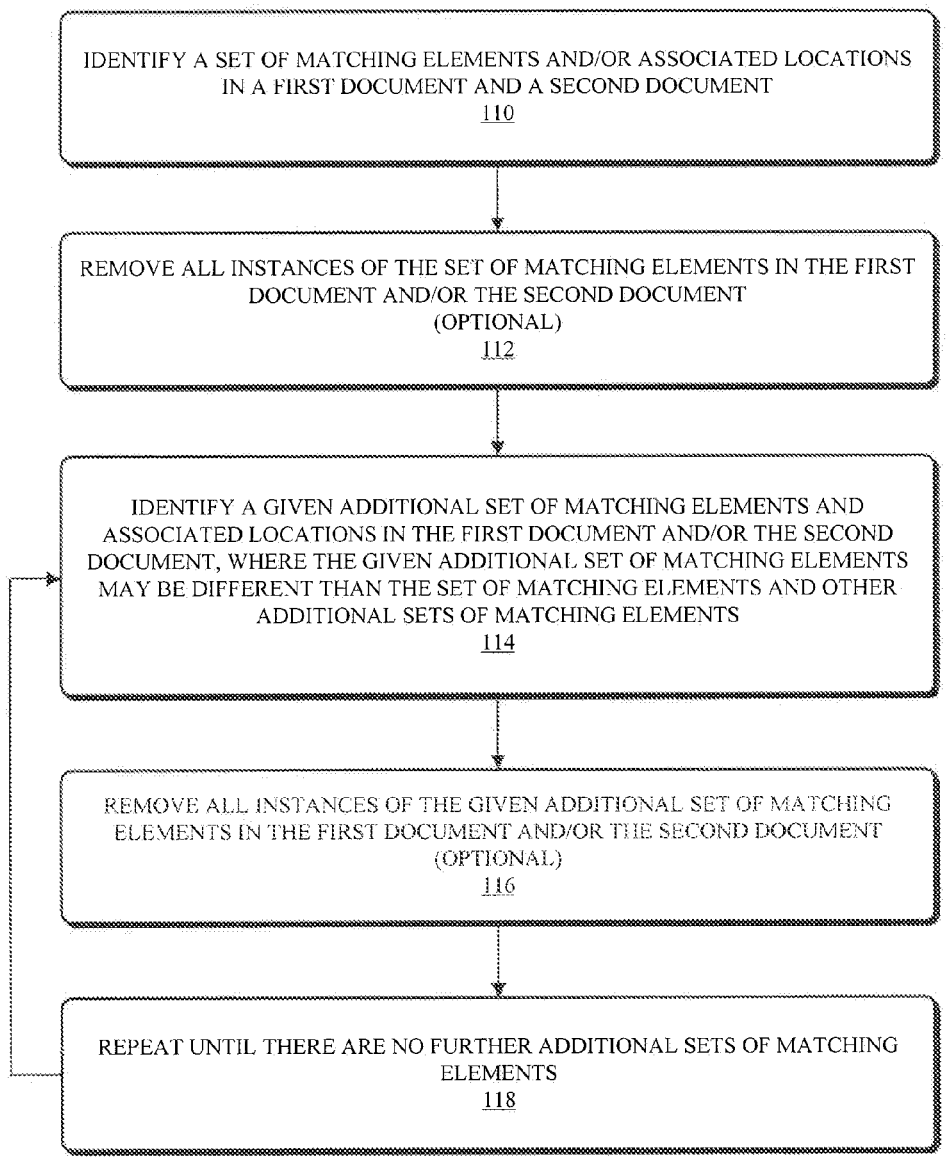
FIG. 1 is a flowchart illustrating an embodiment of a process for comparing documents.

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present disclosure is not intended to be limited to the embodiments shown, but is to be accorded the widest scope consistent with the principles and features disclosed herein.

Embodiments of a computer system, a method, and a computer-program product (e.g., software) for use with the computer system are described. These systems, processes, and data structures may be used to compare and display differences between different versions of a document, such as a computer program that includes computer-software instructions. Alternatively, the document(s) may include information associated with one or more web pages. For example, the web pages may be scraped from host sites on a network, such as the Internet and/or an intranet, and the document(s) and/or a difference with a previous version of the document(s) may be stored in a repository of documents that includes documents scraped from other host sites.

During the comparison technique, a set of matching elements (such as one or more characters, one or more words, or one or more lines) and associated locations in a first document and/or a second document may be identified (for example, using a longest-common-subsequence or LCS technique). Next, additional sets of matching elements (such as one or more characters, one or more words, or one or more lines) and associated locations in the first document and/or the second document may be repeatedly identified (for example, using the LCS technique) until there are no further matches.

Note that a given additional set of matching elements may be different than the set of matching elements and other additional sets of matching elements. Moreover, a size of the given additional set of matching elements may be smaller than sizes of the set of matching elements and/or other additional sets of matching elements. Additionally, note that one or more locations of a given set of matching elements, which can be the set of matching elements or one of the additional sets of matching elements, in the second document may be different than one or more locations of the given additional set of matching elements in the first document. Consequently, the comparison technique may identify regions in the second document that have been moved relative to their location(s) in the first document.

In some embodiments, labels may be assigned to instances of matching elements. These labels, as well as other context information, may facilitate comparison of the first document and the second document when these documents are displayed.

This comparison technique may decrease the amount of time necessary to determine the differences between different versions of a document. For example, using this comparison technique, reviews of changes to a computer program may be expedited, thereby facilitating high-quality and lower-cost software development.

Note that one or more documents and/or differences between different versions of these documents may be received and transmitted over a network, such as: the Internet or World Wide Web (WWW), an intranet, a local area network (LAN) (such as IEEE 802.11 or WiFi), a wide area network (WAN) (such as IEEE 802.16 or WiMAX), a metropolitan area network (MAN), a satellite network, a wireless network (such as a cellular telephone network), an optical network, and/or a combination of networks or other technology enabling communication between computing systems or electronic devices.

We now describe embodiments of a method and a comparison computer program for comparing documents. FIG. 1 presents a flowchart illustrating an embodiment of a process 100 for comparing documents, which may be performed by a computer system. During operation, the computer system identifies a set of matching elements and associated locations in a first document and/or a second document (110). In some embodiments, the computer system optionally removes all instances of the set of matching elements in the first document and/or the second document (112).

Next, the computer system identifies a given additional set of matching elements and associated locations in the first document and/or the second document (114). Note that a given additional set of matching elements may be different than the set of matching elements and other additional sets of matching elements. Moreover, in some embodiments, the computer system optionally removes all instances of the given additional set of matching elements in the first document and/or the second document (116). Then, the computer system repeats operations (114) and (116) until there are no further additional sets of matching elements (118).

Note that in some embodiments of process 100 there may be additional or fewer operations. Moreover, the order of the operations may be changed, and two or more operations may be combined into a single operation.

In the discussion that follows, the sets of matching elements identified during operation (110) and the additional sets of matching elements identified during operation (114) are sometimes referred to as sets of matching elements. These sets of matching elements can be distinguished from each other based on when they are identified during process 100.

Figure 2:
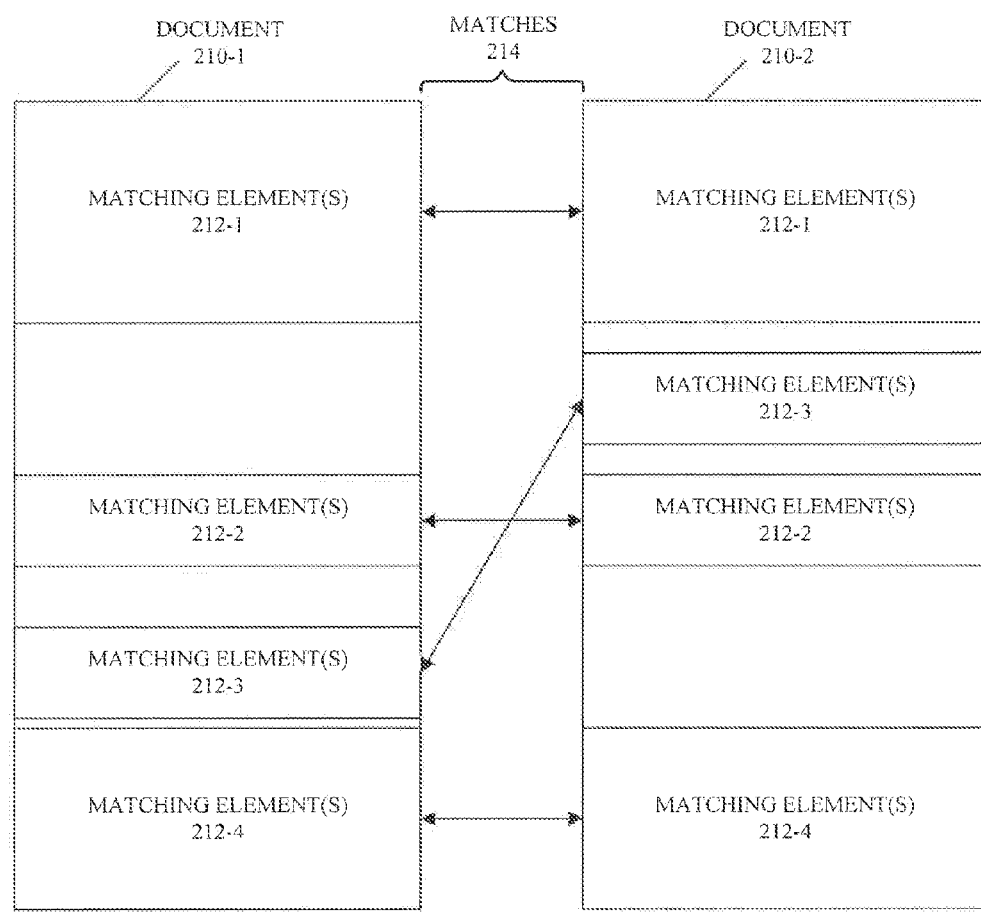
FIG. 2 is a block diagram illustrating an embodiment of two versions of a document.

FIG. 2 presents a block diagram illustrating an embodiment 200 of two versions 210 of a document, such as the first document and the second document in process 100 (FIG. 1). For example, version 210-2 may be a revision of version 210-1. Consequently, a time stamp associated with a modification of version 210-2 may be later than a time stamp associated with a modification of version 210-1.

Versions 210 may each include sets of matching elements 212, which may include one or more characters, one or more words, and/or one or more lines. In an exemplary embodiment, at least one of the versions 210 includes 10,000 lines and a total of 100,000 characters.

During an initial pass of the comparison technique (such as operation 110 in FIG. 1), one or more sets of matching elements in either or both of the versions 210 that are 'unchanged' may be identified based on matches 214. In particular, these unchanged sets of matching elements may be at the same locations in each of the versions 210 and may include identical or substantially identical content (such as the one or more characters, one or more words, and/or one or more lines). For example, sets of matching elements 212-1, 212-2 and/or 212-4 may be identified as unchanged, and these locations (and the label 'unchanged') may be stored in a data structure for subsequent use (such as when the versions 210 are displayed). Alternatively, in some embodiments the locations and the label 'unchanged' may be exported to the data structure at the end of the comparison technique.

In some embodiments, the sets of matching elements during the identifying operations (110) and (114) in process 100 (FIG. 1) are identified using an LCS technique. Consequently, in the initial pass, sets of matching elements from largest to smallest, such as matching elements 212-1 and, then, matching elements 212-2, may be identified. (Thus, in some embodiments, the initial pass may include multiple instances of the identifying operation, such as operation 110 in FIG. 1.) This may facilitate the identification of small changes within sets of matching elements in either or both of the versions 210.

However, in other embodiments other techniques may be used. Moreover, at least some of the identified sets of elements may have the same size. In general, sets of matching elements 212 in version 210-1 are non-overlapping. Note that one or more elements in each of the unchanged sets of matching elements in either or both of the versions 210 may or may not be globally unique.

As described previously, in some embodiments of the comparison technique all instances of the sets of matching elements that were identified or matched during the initial pass (and/or subsequent passes) may be discarded. For example, sets of matching elements 212-1, 212-2 and/or 212-4 may be removed from either or both versions 210. In some embodiments, a marker or identifier may be added to either or both versions 210 (or to a corresponding data structure) at locations corresponding to instances of the sets of matching elements that were identified. This marker may indicate that one or more instances of the sets of matching elements were discarded.

During one or more subsequent passes of the comparison technique, additional sets of matching elements may be identified from the remainder of the versions 210 using matches 214. For example, using the LCS technique, additional sets of matching elements 212-3 may be identified. Note that these additional sets of matching elements may be 'moved' (e.g., unchanged but at different locations in the versions 210), and these locations (and the label 'moved') may be stored in a data structure for subsequent use (for example, when the versions 210 are displayed). Alternatively, in some embodiments the locations and the label 'moved' may be exported to the data structure at the end of the comparison technique.

This comparison technique may be repeated recursively until no additional sets of matching elements are identified. Note that the remainder of the versions 210 at the conclusion of the comparison technique (which excludes the sets of matching elements 212) may include regions (or other sets of elements) that are different from each other in the versions 210. In some embodiments, these regions are assigned or associated with a label of 'changed.'

Figure 4A:
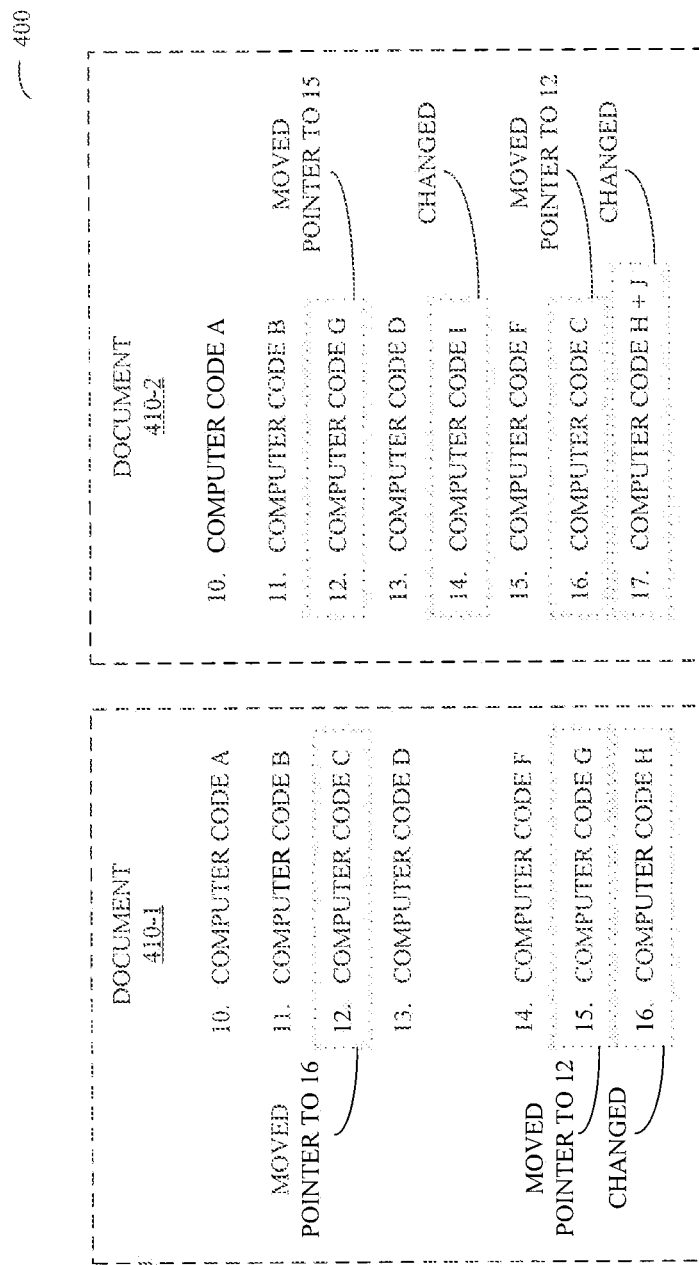
FIG. 4A is a block diagram illustrating an embodiment of two versions of a document.

As described further below with reference to FIGS. 4A and 4B, when the versions 210 are displayed, the labels ('unchanged,' 'changed' and 'moved') and locations such as associated line numbers) of the identified sets of matching elements may be used. In particular, this information may facilitate faster and/or more accurate comparisons of these versions, such as by a software developer.

Note that in some embodiments of the versions 210 there may be additional or fewer components (such as sets of elements 212). Moreover, the order of the components may be changed, and two or more components may be combined into a single component.

Figure 3:
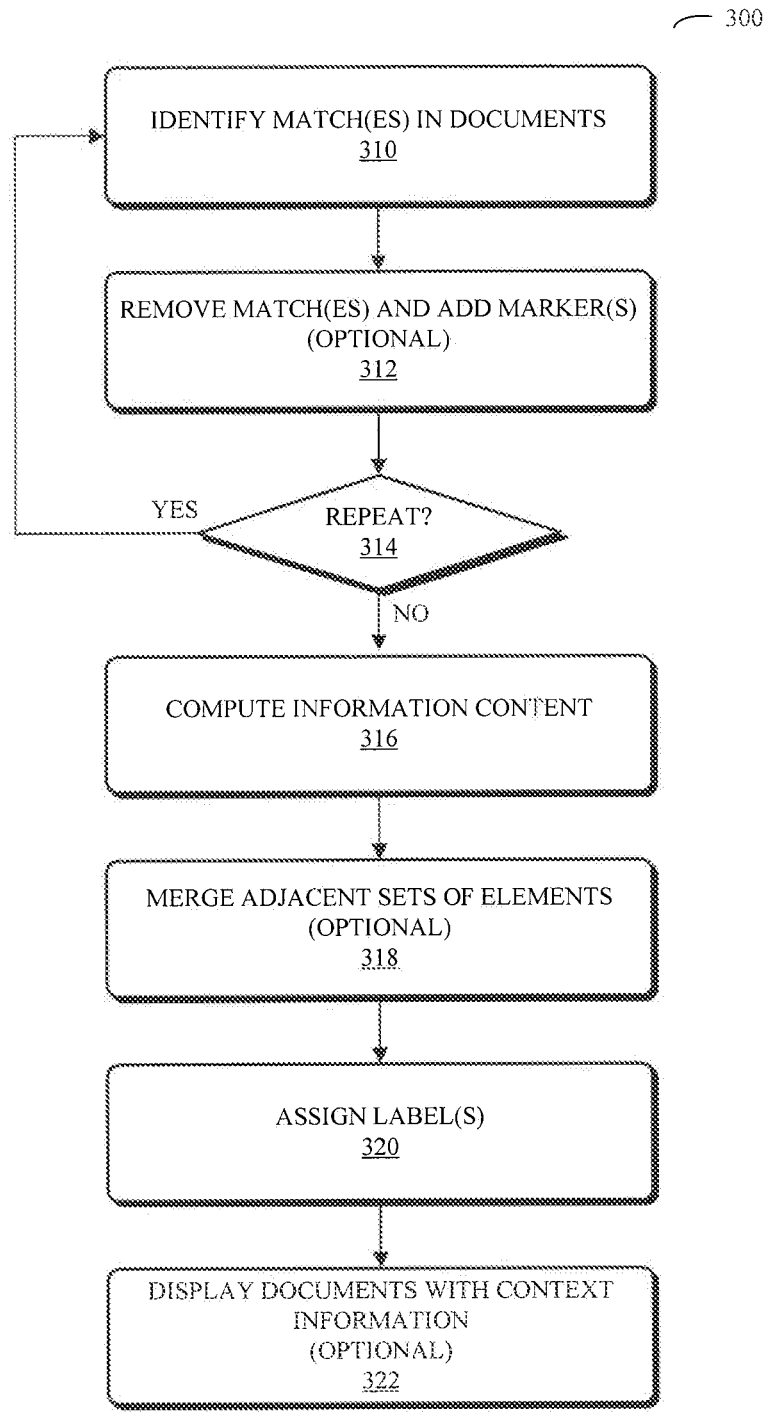
FIG. 3 is a flowchart illustrating an embodiment of a process for comparing documents.

FIG. 3 presents a flowchart illustrating an embodiment of a process 300 for comparing documents, which may be performed by a computer system. During operation, the computer system identifies match(es) (such as the sets of matching elements 212 in FIG. 2) in two or more documents (31.0), such as different versions of a particular document. Then, the computer system may optionally remove the match(es) from and add markers to one or more of the documents (312). Alternatively, the markers and the related locations may be stored in data structure (e.g., the markers may be associated with the documents). Moreover, operations (310) and (312) may be repeated (314) until there are no more matches.

Then, the computer system may compute information content (316) of one or more identified sets of matching elements. In general, this information-content computation may be performed on the sets of matching elements identified during the initial pass (e.g., those sets of matching elements associated with the label 'unchanged') and/or during subsequent passes (e.g., those sets of matching elements associated with the label 'moved'). In some embodiments, the information content of a particular set of matching elements is computed if there is more than one character in this set of matching elements. Note that the information-content computation may facilitate avoiding or skipping of sets of matching elements that are a null set, such as a blank line.

In some embodiments, the information content in the particular set of matching elements is based on the number of characters in the set of matching elements. Thus, sets of matching elements that have more characters may be deemed to have more information content than other sets of matching elements. Moreover, computing the information content may include or involve applying a first weight to a first character or type of character in the set of matching elements and a second weight to a second character or type of character in the set of matching elements. For example, the information content may be calculated using a summation of the weights or values of the characters in the set of matching elements. In an exemplary embodiment, blanks, tabs, and spaces may have a lower weight than other characters.

Additionally, a weight associated with a given character may be based on how much 'information' (for example, an information metric) is associated with the given character. Thus, an alphanumerical letter may have one weight and logic or arithmetic operations may have another weight. Moreover, this information metric may be based on a lexicography or dictionary used in the documents. In particular, the weights may be based on a language of the documents, such as a programming language. Note that in some embodiments, the programming language of one of the documents may be determined or inferred based on a file extension.

In an exemplary embodiment, the computer system may assign or associate a label (320) to a particular instance of a set of matching elements. This label may be based on the information content. For example, a label associated with the instance of the set of matching elements in either or both versions of the document that is identified during the initial pass may be: 'unchanged' if the information content is greater than or equal to a pre-determined value; and 'changed' if the information content is less than the pre-determined value. Similarly, a label associated with the instance of the set of matching elements in either or both versions of the document that is identified during one of the subsequent passes may be: 'moved' if the information content is greater than or equal to another pre-determined value; and 'changed' if the information content is less than the other pre-determined value.

Note that the pre-determined value and the other pre-determined value may be the same or may be different. Thus the pre-determined values or thresholds used may vary during different instances of the identifying (e.g., during different passes of the comparison technique). For example, during the initial pass the pre-determined value may be five characters or more, while during one of the subsequent passes the other pre-determined value may be between 20 and 100 characters. Thus, during one of the subsequent passes, one of the sets of matching elements (such as one of the additional sets of matching elements) may be associated with the label 'moved' if it includes more than 20 characters. Note that a threshold of 20 characters results in a larger number of sets of matching elements that are associated with the label 'moved,' while a threshold of 100 characters results in sets of matching elements that are larger (e.g., they include more lines of code or software instructions).

As described further below with reference to FIG. 4B, in some embodiments the computer system optionally combines or merges adjacent sets of elements (318) into a larger group of matching elements. For example, if there are two sets of matching elements that are associated with the label 'moved' (thus, these sets of matching elements were identified during one of the subsequent passes) that are separated by an intervening set of matching elements that is associated with the label 'changed,' these sets of matching elements may be optionally merged into a single group of elements (with an associated range of lines). This group of elements may be associated with a label of 'moved and changed' or 'moved.'

In an exemplary embodiment, a set of matching elements that includes one line and has the label 'changed' is surrounded by two sets of matching elements that each include five or more lines. These three sets of matching elements may be combined into a single group of elements. Note that this group is defined based on context information (line numbers and labels) that is determined earlier in the process 300.

After labels have been assigned (320), context information, such as line numbers of sets of matching elements and the associated labels may be output. This context information may be used to optionally display the one or more documents (322). As described further below with reference to FIG. 4A, the documents may be displayed or presented in a human-readable way that facilitates comparison of these documents.

Note that in some embodiments of process 300 there may be additional or fewer operations. Moreover, the order of the operations may be changed, and two or more operations may be combined into a single operation. For example, the information content may be computed after a given instance of the identifying (310), i.e., with the recursive loop.

Note that there are a number of implementations of the LCS technique that may be used during the comparison technique. Alternatively, another matching technique may be used, such as one that generates an 'optimal' subsequence that includes large groups of contiguous matches (as opposed to the longest subsequence). In some embodiments, each of the sets of matching elements and/or the additional sets of matching elements is unique in a given document.

We now describe embodiments of displaying documents (such as one or more versions of a document) including context information. FIG. 4A presents a block diagram illustrating an embodiment 400 of two versions 410 of a document. In particular, each of the versions 410 includes context information, such as a label 'moved' or 'changed' associated with a region (or a set of elements). Note that the context information displayed with regions in version 410-1 that is moved to different locations in version 410-2 includes pointers (such as line numbers) to these other locations. Similarly, the context information displayed with regions in version 410-2 that is moved from original locations in version 410-1 includes pointers (such as line numbers) to these original locations.

In some embodiments, the pointers in one of the versions 410 include links to locations in the other of the versions 410. Additionally, regions having different labels may have different colors or color coding. These features, as well as the context information, may provide contextual awareness to a user (such as a software developer) even when the regions are far apart (e.g., the locations of the regions in the versions 410 are very different).

Figure 4B:
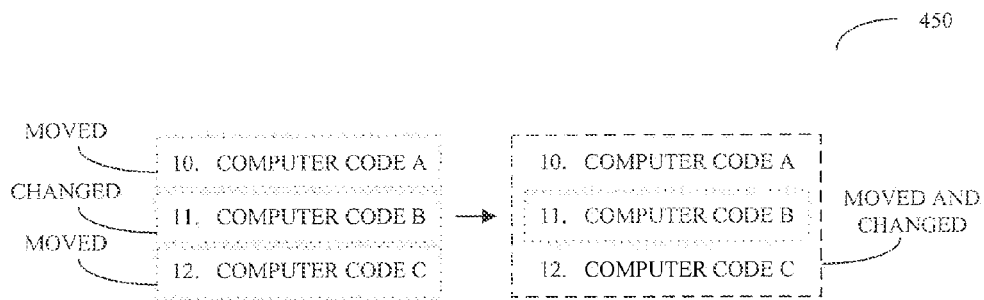
FIG. 4B is a block diagram illustrating an embodiment of two versions of a document.

FIG. 4B presents a block diagram illustrating an embodiment 450 of two versions of a document. As noted previously, adjacent sets of matching elements that have the labels 'moved,' 'changed' and 'moved,' respectively, may be combined into a single group of elements and may be associated with the label 'moved and changed.'

Note that embodiments 400 (FIG. 4A) and 450 may have additional or fewer components (such as elements 212). Moreover, the order of the components may be changed, and two or more components may be combined into a single component.

Figure 5:
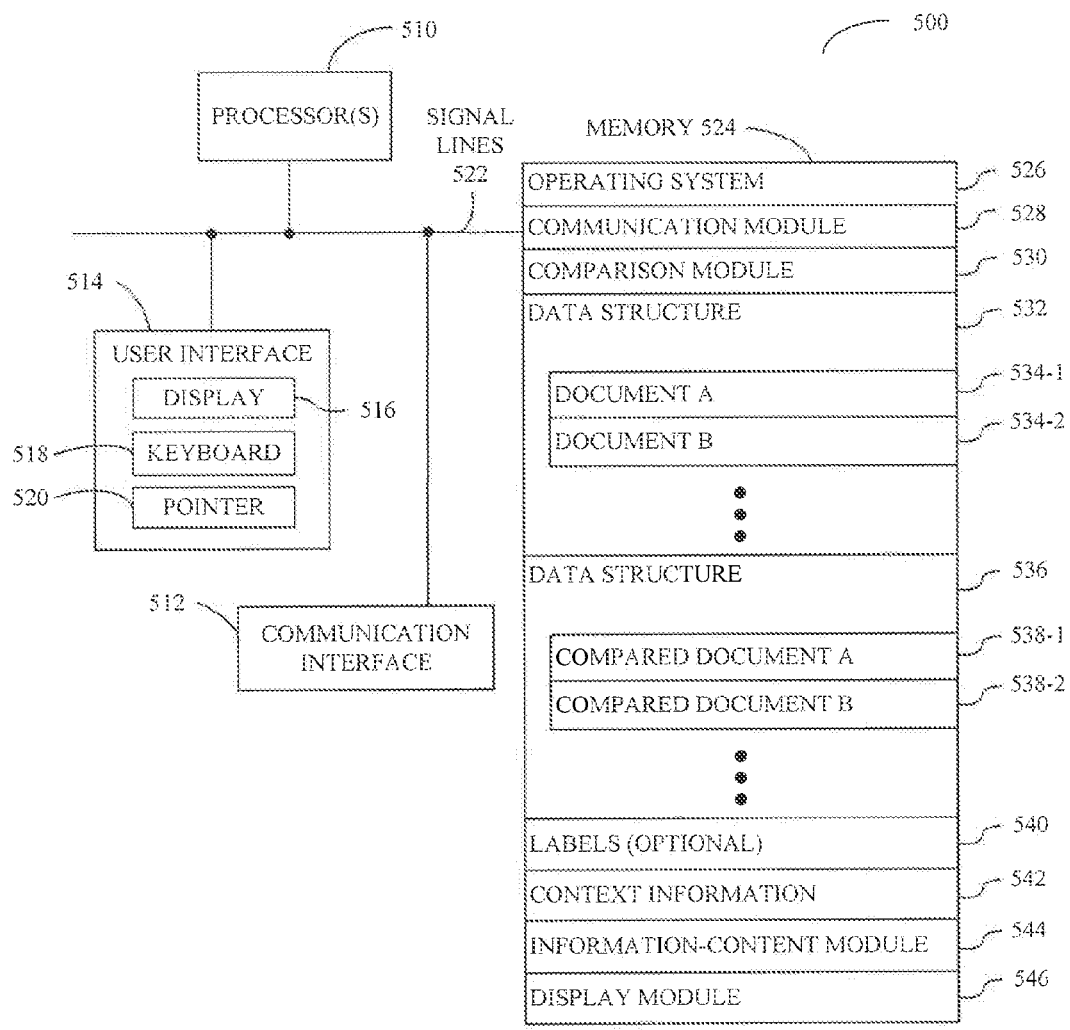
FIG. 5 is a block diagram illustrating an embodiment of a computer system.

We now describe embodiments of a computer system that may be used to perform a comparison of different versions of a document. FIG. 5 presents a block diagram illustrating an embodiment of a computer system 500. Computer system 500 includes: one or more processors 510, a communication interface 512, a user interface 514, and one or more signal lines 522 coupling these components together. Note that the one or more processing units 510 may support parallel processing and/or multi-threaded operation, the communication interface 512 may have a persistent communication connection, and the one or more signal lines 522 may constitute a communication bus. Moreover, the user interface 514 may include: a display 516, a keyboard 518, and/or a pointer 520, such as a mouse.

Memory 524 in the computer system 500 may include volatile memory and/or non-volatile memory. More specifically, memory 524 may include: ROM, RAM, EPROM, EEPROM, Flash, one or more smart cards, one or more magnetic disc storage devices, and/or one or more optical storage devices. Memory 524 may store an operating system 526 that includes procedures (or a set of instructions) for handling various basic system services for performing hardware-dependent tasks. While not shown in FIG. 5, the operating system 526 may include a browser (or set of instructions) for providing and/or rendering information in web pages. Memory 524 may also store communications procedures (or a set of instructions) in a communication module 528 (for example, a Universal Serial Bus driver). These communication procedures may be used for communicating with: one or more computers, device and/or servers, including computers, devices and/or servers that are remotely located with respect to the computer system 500.

Memory 524 may also include one or more program modules (or a set of instructions), including: comparison module 530 (or a set of instructions), information-content module 544 (or a set of instructions) and/or display module 546 (or a set of instructions). Comparison module 530 may compare different versions of a document, such as document A 534-1 and/or document B 534-2, in data structure 532.

Results of these comparisons may be stored in data structure 536, such as compared document A 538-1 and/or compared document B 538-2. Note that these compared documents 538 may include or may be associated with optional labels 540 and/or context information 542.

In some embodiments, information-content module 544 is used to determine whether or not a given region in one of the documents 534, which is identified by comparison module 530, has sufficient information content. Based on the information content, one of the optional labels 540 may be included in or associated with one of the compared documents 538.

After the comparison of the documents 534, display module 546 may display two or more compared documents 538, including the optional labels 540 and/or the context information 542. This additional information may make changes in the documents 534, including one or more moved regions, more evident to a user who is examining the displayed documents.

Instructions in the various modules in the memory 524 may be implemented in: a high-level procedural language, an object-oriented programming language, and/or in an assembly or machine language. The programming language may be compiled or interpreted, i.e., configurable or configured to be executed by the one or more processing units 510.

Although the computer system 500 is illustrated as having a number of discrete components, FIG. 5 is intended to be a functional description of the various features that may be present in the computer system 500 rather than as a structural schematic of the embodiments described herein. In practice, and as recognized by those of ordinary skill in the art, the functions of the computer system 500 may be distributed over a large number of servers or computers, with various groups of the servers or computers performing particular subsets of the functions. For example, as noted previously, in some embodiments at least a portion of the functions and/or content illustrated in FIG. 5 may be stored and/or implemented on a client computer that communicates with the computer system 500 using a network.

In particular, in some embodiments the comparison of different documents 534 occurs between one or more client computers and at least one server computer, which communicate through a network such as the Internet. For example, a comparison computer program (such as comparison module 530) that includes instructions for operations in the comparison technique may be resident on the one or more client computers and may execute on the one or more client computers.

° Alternatively, the comparison computer program may be resident on at least the one server computer. This comparison computer program may execute on at least the one server computer or may be embedded in a web page and may execute on the one or more client computers (either as a stand-alone application or as a portion of another application). Note that this web page may be provided by at least the one server computer via the network. For example, the comparison computer program may be a software package written in: JavaScript™ (e.g., the comparison computer program includes programs or procedures containing JavaScript™ instructions), ECMAScript (the specification for which is published by the European Computer Manufacturers Association International), VBScript™ (a trademark of Microsoft, Inc.) or any other client-side scripting language. In other words, the comparison computer program may include programs or procedures containing: JavaScript™, ECMAScript instructions, VBScript™ instructions, or instructions in another programming language suitable for rendering by a browser or another client application on a given client computer. Therefore, in some embodiments a user of the comparison computer program may not have to download the comparison computer program onto one of the client computers in order to use it.

In some embodiments, some or all of the functionality of the computer system 500 may be implemented in one or more ASICs and/or one or more digital signal processors DSPs.

Computer system 500 may include fewer components or additional components. Moreover, two or more components may be combined into a single component, and/or a position of one or more components may be changed. In some embodiments, the functionality of computer system 500 may be implemented more in hardware and less in software, or less in hardware and more in software, as is known in the art.

Figure 6:
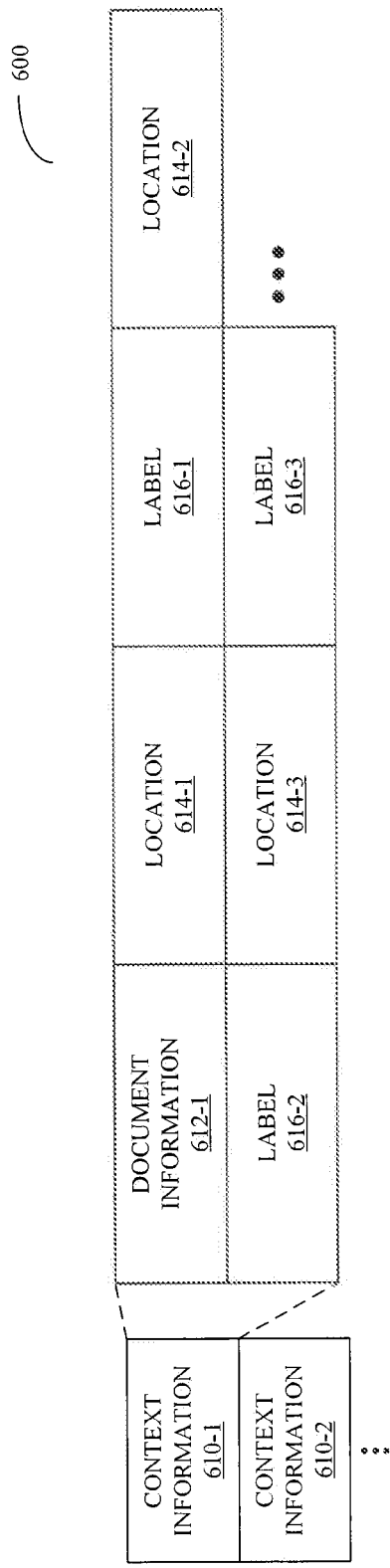
FIG. 6 is a block diagram illustrating an embodiment of a data structure.

We now describe embodiments of a data structure that may be used in computer system 500. FIG. 6 presents a block diagram illustrating an embodiment of a data structure 600. This data structure may include context information 610. For example, context information 610-1 may include information associated with one or more regions in different versions of a document. In particular, context information 610-1 may include: document information 612-1 and pairs of locations and associated labels, such as location 614-1 and label 616-1. In some embodiments, data structure 600 includes fewer or additional components. Moreover, two or more components may be combined into a single component, and/or a position of one or more components may be changed.

While the preceding embodiments have used the comparison of differed versions of a computer program as an illustrative example, in other embodiments the comparison technique is used to compare other types of documents, such as word-processor documents or web pages. In particular, the comparison technique may be used to determine differences between versions of a document (such as a web page) that are scraped from one or more host sites on a network, such as the Internet. For example, the versions may include an original and an updated version of a web page or website. These versions may be stored in a repository of documents that is used to facilitate the processing of search queries. Consequently, the comparison technique may facilitate more efficient comparisons of these versions (for example, by readily identifying moved content) and/or more efficient (or compact) storage of these versions.

The foregoing descriptions of embodiments have been presented for purposes of illustration and description only. They are not intended to be exhaustive or to limit the present embodiments to the forms disclosed. Accordingly, many modifications and variations will be apparent to practitioners skilled in the art. Additionally, the above disclosure is not intended to limit the present embodiments. The scope of the present embodiments is defined by the appended claims.

What is claimed is:

1. A method for comparing documents, comprising:
   repeatedly identifying sets of matching elements and associated locations of the matching elements in a first document and a second document until there are no further matches;
   determining instances of unchanged elements between the first and second documents;
   determining instances of moved elements between the first and second documents, wherein the determination of the instances of moved elements is based on a relative location difference of the identified matching elements in the first and second documents;
   assigning identifiers to instances of the set of matching elements, wherein the identifiers identify a relationship for the corresponding instances of the set of matching elements, and wherein assigning the identifiers comprises:
      assigning an identifier indicating unchanged elements to instances of the set of matching elements in the second document when the associated location of the set of matching elements is the same for both the first document and the second document, and
      assigning an identifier indicating moved elements to instances of the set of matching elements when the associated location of the set of matching elements is different for both the first document and the second document, and
   displaying the first document and the second document with context information based on those portions of the second document that are associated with the identifier indicating unchanged elements, the identifier indicating moved elements, or both.

2. The method of claim 1, further comprising assigning an identifier indicating changed elements to a remainder of the second document, wherein the remainder excludes the instances assigned the identifier indicating unchanged elements and the instances assigned the identifier indicating moved elements.

3. The method of claim 2, further comprising combining adjacent sets of matching elements into a group of matching elements.

4. The method of claim 3, further comprising:
   assigning an identifier indicating moved and changed elements to the adjacent sets of matching elements when the adjacent sets of matching elements include two instances of matching elements assigned the identifier indicating moved elements that are separated by an intervening set of matching elements assigned the identifier indicating changed elements.

5. The method of claim 1, wherein the context information displayed with the first document includes a pointer to a location of an instance of one of the sets of matching elements in the second document.

6. The method of claim 1, wherein the first and second documents include computer-software instructions.

7. The method of claim 1, wherein the first and second documents include web pages.

8. The method of claim 1, wherein the second document is a revised version of the first document.

9. The method of claim 1, wherein a time stamp associated with a modification of the second document is later than a time stamp associated with a modification of the first document.

10. The method of claim 1, wherein the documents are to be stored in a repository of documents that includes documents scraped from host sites on a network.

11. The method of claim 10, wherein the network includes the Internet, an intranet, or both.

12. The method of claim 1, wherein a given set of matching elements, includes one or more characters, one or more words, or one or more lines.

13. The method of claim 1, wherein identifying the sets of matching elements comprises identifying the sets using a longest-common-subsequence technique.

14. The method of claim 1, further comprising removing all instances of the matching elements from the first and the second documents respectively.

15. A non-transitory computer-readable storage medium, having instructions stored thereon that, when executed by one or more computers, cause the one or more computers to perform operations comprising:
   repeatedly identifying sets of matching elements and associated locations of the matching elements in a first document and a second document until there are no further matches;
   determining instances of unchanged elements between the first and second documents;
   determining instances of moved elements between the first and second documents, wherein the determination of the instances of moved elements is based on a relative location difference of the identified matching elements in the first and second documents; and
   assigning identifiers to instances of the set of matching elements, wherein the identifiers identify a relationship for the corresponding instances of the set of matching elements, and wherein assigning the identifiers comprises:
      assigning an identifier indicating unchanged elements to instances of the set of matching elements in the second document when the associated location of the set of matching elements is the same for both the first document and the second document, and
      assigning an identifier indicating moved elements to instances of the set of matching elements when the associated location of the set of matching elements is different for both the first document and the second document, and
   displaying the first document and the second document with context information based on those portions of the second document that are associated with the identifier indicating unchanged elements, the identifier indicating moved elements, or both.

16. The computer-readable storage medium of claim 15, wherein the operations further comprise assigning an identifier indicating changed elements to a remainder of the second document, wherein the remainder excludes the instances assigned the identifier indicating unchanged elements and the instances assigned the identifier indicating moved elements.

17. The computer-readable storage medium of claim 16, wherein the operations further comprise combining adjacent sets of matching elements into a group of matching elements.

18. The computer-readable storage medium of claim 17, wherein the operations further comprise:
assigning an identifier indicating moved and changed elements to the adjacent sets of matching elements when the adjacent sets of matching elements include two instances of matching elements assigned the identifier indicating moved elements that are separated by an intervening set of matching elements assigned the identifier indicating changed elements.

19. The computer-readable storage medium of claim 15, wherein the context information displayed with the first document includes a pointer to a location of an instance of one of the sets of matching elements in the second document.

20. The computer-readable storage medium of claim 15, wherein identifying the sets of matching elements comprises identifying the sets using a longest-common-subsequence technique.

21. The computer-readable storage medium of claim 15, wherein the operations further comprise removing all instances of the matching elements from the first and the second documents respectively.

22. A computer system, comprising:
a processor;
a memory;
a program module, wherein the program module is stored in the memory and configured to be executed by the processor, the program module comprising:
instructions for repeatedly identifying sets of matching elements and associated locations of the matching elements in the first document and the second document until there are no further matches,
instructions for determining instances of unchanged elements between the first and second documents,
instructions for determining instances of moved elements between the first and second documents, wherein the determination of the instances of moved elements is based on a relative location difference of the identified matching elements in the first and second documents,
and
instructions for assigning identifiers to instances of the set of matching elements, wherein the identifiers identify a relationship for the corresponding instances of the set of matching elements, and wherein assigning the identifiers comprises:
assigning an identifier indicating unchanged elements to instances of the set of matching elements in the second document when the associated location of the set of matching elements is the same for both the first document and the second document, and
assigning an identifier indicating moved elements to instances of the set of matching elements when the associated location of the set of matching elements is different for both the first document and the second document, and
displaying the first document and the second document with context information based on those portions of the second document that are associated with the identifier indicating unchanged elements, the identifier indicating moved elements, or both.

23. The system of claim 22, wherein the program module further comprises instructions for assigning an identifier indicating changed elements to a remainder of the second document, wherein the remainder excludes the instances assigned the identifier indicating unchanged elements and the instances assigned the identifier indicating moved elements.

24. The system of claim 23, wherein the program module further comprises instructions for combining adjacent sets of matching elements into a group of matching elements.

25. The system of claim 24, wherein the program module further comprises:
instructions for assigning an identifier indicating moved and changed elements to the adjacent sets of matching elements when the adjacent sets of matching elements include two instances of matching elements assigned the identifier indicating moved elements that are separated by an intervening set of matching elements assigned the identifier indicating changed elements.

26. The system of claim 22, wherein the context information displayed with the first document includes a pointer to a location of an instance of one of the sets of matching elements in the second document.

27. The system of claim 22, wherein the instructions for identifying the sets of matching elements comprises instructions for identifying the sets using a longest-common-subsequence technique.

28. The system of claim 22, wherein the program module further comprise instructions for removing all instances of the matching elements from the first and the second documents respectively.

* * * * *